United States Patent
Chen et al.

(10) Patent No.: US 9,792,843 B2
(45) Date of Patent: Oct. 17, 2017

(54) LOAD DRIVING APPARATUS AND GRAYSCALE VOLTAGE GENERATING CIRCUIT

(71) Applicant: Novatek Microelectronics Corp., Hsinchu (TW)

(72) Inventors: Ji-Ting Chen, Hsinchu County (TW); Wei-Hsiang Hung, Hsinchu (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 305 days.

(21) Appl. No.: 13/781,777

(22) Filed: Mar. 1, 2013

(65) Prior Publication Data
US 2014/0078189 A1 Mar. 20, 2014

(30) Foreign Application Priority Data
Sep. 19, 2012 (TW) .............................. 101134312 A

(51) Int. Cl.
G09G 3/00 (2006.01)
H02J 4/00 (2006.01)
H04N 5/14 (2006.01)

(52) U.S. Cl.
CPC ................. *G09G 3/00* (2013.01); *H02J 4/00* (2013.01); *H04N 5/148* (2013.01); *G09G 2320/0276* (2013.01); *G09G 2320/0626* (2013.01); *Y10T 307/461* (2015.04)

(58) Field of Classification Search
None
See application file for complete search history.

(56) References Cited

U.S. PATENT DOCUMENTS

| | | | |
|---|---|---|---|
| 2007/0290969 A1* | 12/2007 | Hsu | G09G 3/3696 345/89 |
| 2008/0291190 A1* | 11/2008 | Kim et al. | 345/211 |
| 2009/0040165 A1* | 2/2009 | Shimatani | 345/98 |
| 2011/0157150 A1* | 6/2011 | Wu | H03F 3/45475 345/214 |

FOREIGN PATENT DOCUMENTS

| | | |
|---|---|---|
| CN | 1532798 | 9/2004 |
| CN | 1643563 | 7/2005 |
| TW | 200951912 | 12/2009 |

(Continued)

*Primary Examiner* — Seokyun Moon
(74) *Attorney, Agent, or Firm* — JCIPRNET

(57) ABSTRACT

A load driving apparatus for driving a plurality of loads is provided. The load driving apparatus includes an output stage module, a load driving module, and an output stage selection module. The output stage module includes a plurality of output stages. Each of the output stages is coupled to a corresponding one of the loads. The load driving module is coupled to the output stage module and outputs a driving signal to drive one of the loads through the output stage module. The output stage selection module is coupled between the output stage module and the load driving module and selects one of the output stages in the output stage module, so that the load driving module drives the load which is coupled to the selected output stage through the selected output stage. Furthermore, a grayscale voltage generating circuit including the foregoing load driving apparatus is also provided.

6 Claims, 3 Drawing Sheets

(56) References Cited

FOREIGN PATENT DOCUMENTS

| TW | M383266 | 6/2010 |
|---|---|---|
| TW | 201027487 | 7/2010 |
| TW | 201223323 | 6/2012 |
| TW | 201229983 | 7/2012 |
| TW | 201234328 | 8/2012 |

* cited by examiner

LOAD DRIVING APPARATUS AND GRAYSCALE VOLTAGE GENERATING CIRCUIT

CROSS-REFERENCE TO RELATED APPLICATION

This application claims the priority benefit of Taiwan application serial no. 101134312, filed on Sep. 19, 2012. The entirety of the above-mentioned patent application is hereby incorporated by reference herein and made a part of this specification.

TECHNICAL FIELD

The disclosure relates to a driving apparatus and voltage generating circuit, and particularly relates to a load driving apparatus and a grayscale voltage generating circuit using the same.

BACKGROUND

To drive a plurality of loads, the conventional load driving apparatus is usually configured with a switch or a multiplexer between the output terminal of the load driving apparatus and the loads to select the load to be driven. Taking an operational amplifier as an example, FIG. 1 is a schematic diagram illustrating a conventional operational amplifier for driving a plurality of loads. Referring to FIG. 1, an operational amplifier includes a single output stage 110 and an internal circuit 120 excluding the output stage 110. A driving ability of a driving signal provided by the internal circuit 120 is enhanced by the output stage 110 and then output to the load to be driven. The output stage 110 is capable of outputting a current to a back-end load for supplying current or voltage. Therefore, to select the load to be driven, switches SW1 and SW2 are respectively configured to connect between loads 10 and 20 and the output stage 110 in FIG. 1. The switches SW1 and SW2 allow the driving signal to select one of the paths to drive the load 10 or 20.

However, since the switches SW1 and SW2 are equivalent to equivalent resistors configured on the driving path when the switches SW1 and SW2 are conducted, the driving ability of the driving signal is reduced before the driving signal is transmitted to the back-end load due to the equivalent resistor. In addition, due to configuration of the switches SW1 and SW2, the driving signal may not drive the load 10 or load 20 with a precise voltage value.

SUMMARY

The disclosure provides a load driving apparatus having a plurality of output stages and capable of driving a plurality of loads.

The disclosure provides a grayscale voltage generating circuit that includes a plurality of the load driving apparatus and provides the grayscale voltage precisely.

The disclosure provides a load driving apparatus for driving a plurality of loads. The load driving apparatus includes an output stage module, a load driving module, and an output stage selection module. The output stage module includes a plurality of output stages. Each of the output stages is coupled to a corresponding one of the loads. The load driving module is coupled to the output stage module and outputs a driving signal output to drive one of the loads through the output stage module. The output stage selection module is coupled between the output stage module and the load driving module and selects one of the output stages according to a selection signal, such that the load driving module drives the load coupled to the selected output stage through the selected output stage.

In an embodiment of the disclosure, the output stage module includes a plurality of selection units. The selection units are coupled between a corresponding one of the output stages and the load driving module. Each of the selection units is conducted according to the selection signal, such that through the conducted selection unit and the output stage coupled to the selection unit, the load driving module drives the load coupled to the output stage.

In an embodiment of the disclosure, when one of the selection units is conducted, rest of the selection units are not conducted.

In an embodiment of the disclosure, the load driving module includes an input stage and a gain stage. The input stage is configured to receive an input signal and generate an internal signal based on the input signal. The gain stage is coupled to the input stage to receive the internal signal, and generates the driving signal to the output stage module based on the internal signal.

In an embodiment of the disclosure, the output stages are output stages in a push-pull configuration, a common source configuration, or a common drain configuration.

The disclosure provides a grayscale voltage generating circuit, including a plurality of gamma resistor strings and a plurality of the load driving apparatus. The gamma resistor strings generate a plurality of grayscale voltages according to the driving signal. The load driving apparatus is configured to receive different gamma voltages and generate the driving signal based on the gamma voltages. The load driving apparatus selects to output the driving signal to one of the gamma resistor strings according to the selection signal, such that the one of the gamma resistor strings generates the grayscale voltages.

In an embodiment of the disclosure, for each of the load driving apparatus, the output stage selection module includes a plurality of selection units. The selection units are coupled between a corresponding one of the output stages and the load driving module. Each of the selection units is conducted according to the selection signal, such that through the conducted selection unit and the output stage coupled to the selection unit, the load driving module drives the load coupled to the output stage.

In an embodiment of the disclosure, for each of the load driving apparatus, when one of the selection units is conducted, rest of the selection units are not conducted.

In an embodiment of the disclosure, for each of the load driving apparatus, the load driving module includes an input stage and a gain stage. The input stage is configured to receive an input signal and generate an internal signal based on the input signal. The gain stage is coupled to the input stage to receive the internal signal, and generates the driving signal to the output stage module based on the internal signal.

In an embodiment of the disclosure, for each of the load driving apparatus, the output stages are output stages in a push-pull configuration, a common source configuration, or a common drain configuration.

In an embodiment of the disclosure, each of the load driving apparatus is an operational amplifier having double output stages.

In view of the above, in the exemplary embodiments of the disclosure, the load driving apparatus has a plurality of output stages which are used with the output stage selection module. The load driving apparatus outputs the driving signal to the corresponding load according to the selection signal and drives the corresponding load.

To make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
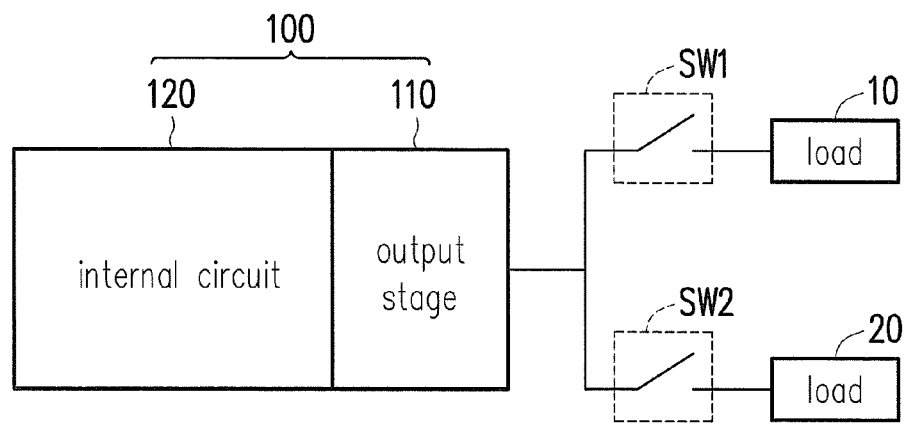
FIG. 1 is a schematic diagram illustrating a conventional operational amplifier for driving a plurality of loads.
Figure 2:
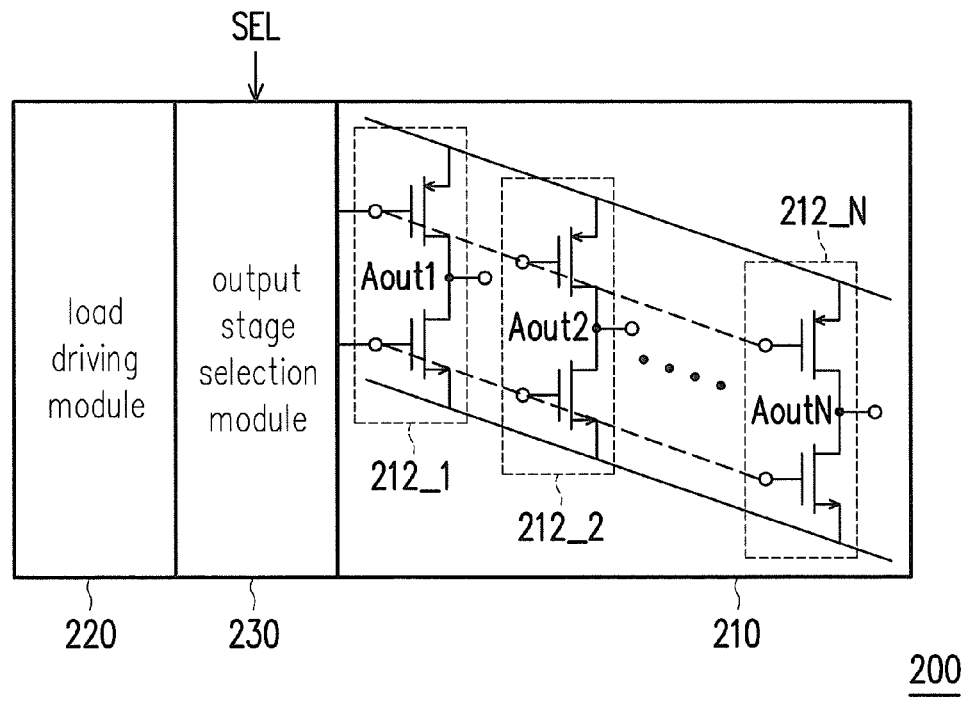
FIG. 2 is a schematic diagram illustrating a load driving apparatus according to an embodiment of the disclosure.

FIG. 2 is a schematic diagram illustrating a load driving apparatus according to an embodiment of the disclosure. Referring to FIG. 2, a load driving apparatus 200 of this embodiment is adapted for driving a plurality of loads (not shown). The load driving apparatus 200 includes an output stage module 210, a load driving module 220, and an output stage selection module 230. In this embodiment, the output stage module 210 includes a plurality of output stages from 212_1, 2122, to 212_N. Each of the output stages is coupled to a corresponding one of the loads (not shown) through an output terminal of each of the output stages. For example, the output stage 212_1 is coupled to the load driven by the output stage 212_1 through an output tell final Aout1 of the output stage 212_1, and the output stage 212_2 is coupled to the load driven by the output stage 212_2 through an output terminal Aout2 of the output stage 212_2. The coupling relation between rest of the output stages and loads may be analogically inferred following the above. A function of each of the output stages is, for example, to increase a driving ability of a driving signal output by the each of the output stages. In addition, in this embodiment, the output stages 212_1, 212_2, to 212_N are exemplified with a push-pull output stage, for example. However, the disclosure does not impose any limitation on a type of each of the output stages. In other embodiments, each of the output stages may be an output stage in a common source or common drain configuration.

In this embodiment, the load driving module 220 is coupled to the output stage module 210 through the output stage selection module 230 and provides a driving signal to the output stage module 210, so as to drive one of the loads coupled to the output stage module 210. In this embodiment, the output stage selection module 230 is coupled between the output stage module 210 and the load driving module 220. The output stage selection module 230 selects one of the output stages in the output stage module 210 according to a selection signal SEL, such that the load driving module 220 drives one of the loads coupled to the load driving module 220 through the selected output stages. For example, the output stage selection module 230 selects to conduct a signal transmitting path in the output stage selection module 230 according to the selection signal SEL. Through the signal transmitting path, the driving signal is transmitted to the output stage 212_2, such that the load driving module 220 drives and output the load coupled to the output stage 212_2 through the output stage 212_2.

Therefore, the load driving apparatus 200 of this embodiment has multiple output stages and is used with the output stage selection module 230. The load driving apparatus 200 selects to output the driving signal to the corresponding load and drive the corresponding load according to the selection signal SEL. Consequently, in this embodiment, the signal transmitting path between the output stage module 210 and each of the loads is unnecessary to be configured with a switch or any kind of selection unit. With such configuration, the problem that a signal driving ability is reduced due to configuration of a switch or selection unit is avoided.

Figure 3:
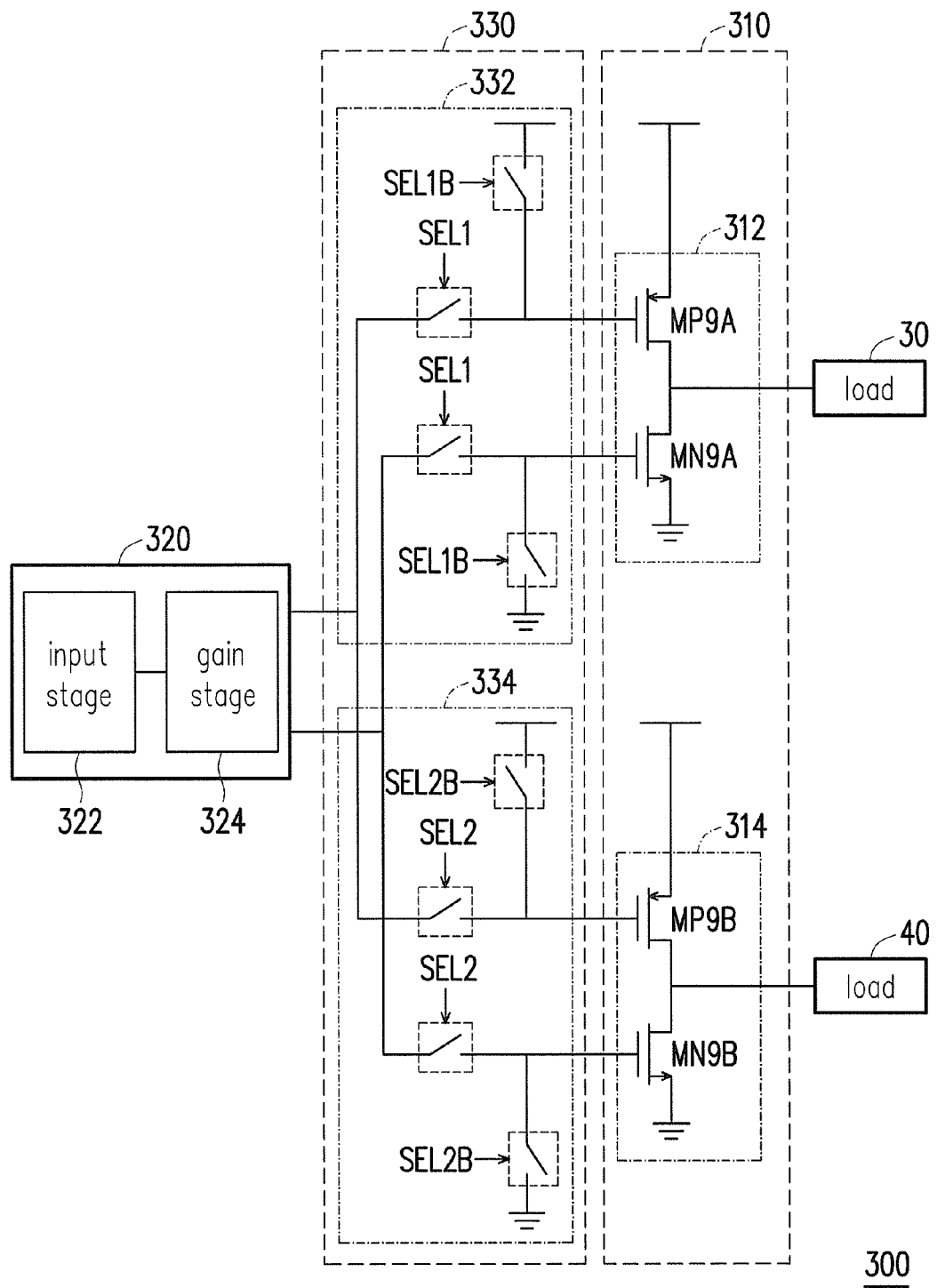
FIG. 3 is a schematic diagram illustrating a load driving apparatus according to another embodiment of the disclosure.

FIG. 3 is a schematic diagram illustrating a load driving apparatus according to another embodiment of the disclosure. Referring to FIG. 3, this embodiment further discloses an embodiment of a circuit in an output stage selection module. However, the embodiment only serves as an exemplary description, and the disclosure is not limited thereto. For a concise description, an output stage module 310 of this embodiment is exemplified with double output stages. However, the disclosure does not limit on the number of output stages.

In this embodiment, the output stage module 310 includes output stages 312 and 314 respectively configured to drive loads 30 and 40. According to the number of output stages, an output stage selection module 330 includes two selection units 332 and 334. The selection unit 332 is coupled between the output stage 312 and the load driving module 320, whereas the selection unit 334 is coupled between the output stage 314 and the load driving module 320. In other embodiments, the output stage selection module 330 may include more than two selection units. In this embodiment, a selection signal includes selection signals SEL1 and SEL2, and based on the selection signal, each of the selection units determines whether to conduct or not, such that the load driving module 320 drives one of the loads through a conducted selection unit and the output stage coupled to the conducted selection unit.

For example, during a driving period, a load driving apparatus 300 drives the load 30, for example. At this time, the selection signal SEL1 conducts a switch coupled between a gate of a transistor MP9A and the load driving module 320 and a switch coupled between a gate of a transistor MN9A and the load driving module 320, so as to provide the driving signal with a transmitting path for transmission to the output stage 312, thereby driving the load 30. In addition, a selection signal SEL1B and the selection signal SEL1 are mutually inverse, so a switch coupled between the gate of the transistor MP9A and a system voltage and a switch coupled between the gate of the transistor MN9A and a ground voltage are turned off, so as to avoid the system voltage turning off the transistor MP9A and the ground voltage turning off the transistor MN9A. During the driving period, the selection unit 334 operates oppositely to the selection unit 332. Namely, the selection signal SEL2 turns off a switch coupled between a gate of a transistor MP9B and the load driving module 320 and a switch coupled between a gate of a transistor MN9B and the load driving module 320, so as to switch off a transmitting path of the driving signal and prevent the driving signal from being output from the output stage 314. A selection signal SEL2B and the selection signal SEL2 are mutually inverse, so a switch coupled between the gate of the transistor MP9B and the system voltage and the switch coupled between the gate of the transistor MN9B and the ground voltage are turned on, such that the system voltage turns off the transistor MP9B and the ground voltage turns off the transistor MN9B. Therefore, when one of the selection units 332 and 334 is conducted, the other of the selection units 332 and 334 is not conducted. The concept is applicable to an output stage selection module with more than two selection units, and an embodying configuration is, for example, that when one of the selection units is conducted, the rest of the selection units are not conducted.

Then, the load driving apparatus 300 drives the load 40 in another driving period, for example. Now, the selection unit 334 operates in the same way as operation of the selection unit 332 in the driving period described above, whereas the selection unit 332 operates in the same way as operation of the selection unit 334 in the driving period described above, so no further detail is reiterated hereinafter.

It should be noted that numbers of the selection unit, selection signal, and output stage of this embodiment are not related to each other. The numbers of the selection unit, selection signal, and output stage may be adjusted based on practical requirement, and the disclosure is not limited thereto.

In addition, if the load driving apparatus 300 in this embodiment is an operational amplifier having double output stages, the load driving module 320 further includes an input stage 322 and a gain stage 324. The input stage 322 is configured to receive an input signal and generate an internal signal based on the input signal. The gain stage 324 is coupled to the input stage 322 to receive the internal signal and generate the driving signal to the output stage selection module 330 based on the internal signal.

Figure 4:
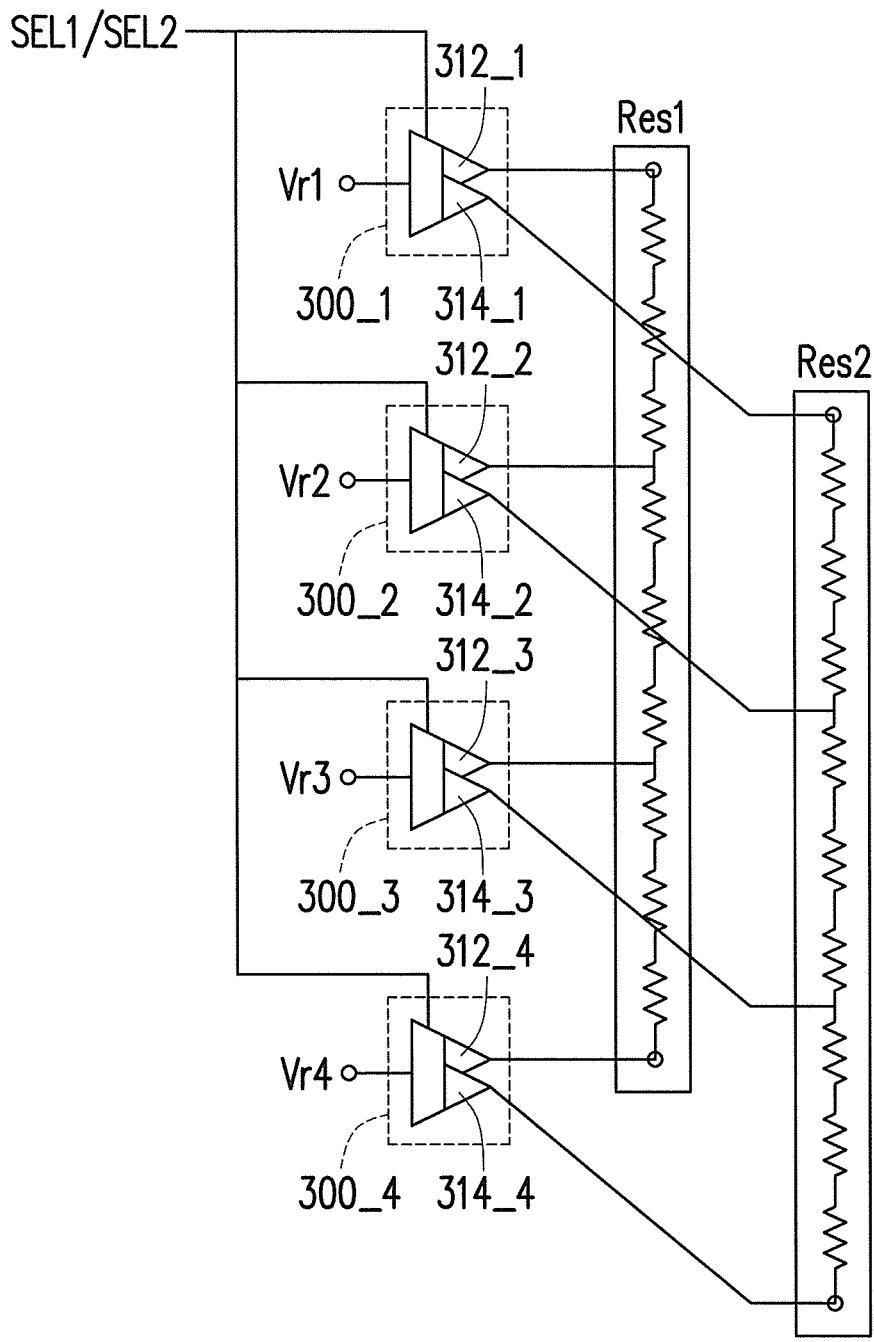
FIG. 4 is a schematic diagram illustrating a grayscale voltage generating circuit according to an embodiment of the disclosure.

FIG. 4 is a schematic diagram illustrating a grayscale voltage generating circuit according to an embodiment of the disclosure. Referring to FIG. 5, a grayscale voltage generating circuit 400 of this embodiment includes a plurality of gamma resistor strings Res1 and Res2 in addition to a plurality of loading driving apparatus (as shown in FIG. 3) 300_1 to 300_4. It should be noted that the load driving apparatus of this embodiment is not limited to a circuit structure disclosed in FIG. 3, wherein each of the load driving apparatus is, for example, an operational amplifier having double output stages.

Specifically, in this embodiment, the gamma resistor string Res1 is coupled to output stages 312_1 to 312_4 of the load driving apparatus 300_1 to 300_4, and the gamma resistor string Res2 is coupled to output stages 314_1 to 314_4 of the load driving apparatus 300_1 to 300_4. The gamma resistor strings Res1 and Res2 respectively generate a plurality of grayscale voltages according to the driving signal provided by the load driving apparatus 300_1 to 300_4. In this embodiment, the load driving apparatus 300_1 to 300_4 are configured to receive different gamma voltages Vr1 to Vr4 and generate the driving signal based on the gamma voltages Vr1 to Vr4. In addition, the load driving apparatus 300_1 to 300_4 select to output the driving signal to one of the gamma resistor strings Res1 and Res2 according to the selection signals SEL1 or SEL2, such that the gamma resistor Res1 or Res2 generates the grayscale voltages.

For example, when the selection signal SEL1 is enabled, the load driving apparatus 300_1 to 300_4 select the respectively corresponding output stages 312_1 to 312_4 to output the driving signal, so as to drive the gamma resistor string Res1 to generate the grayscale voltages according to the gamma voltages Vr1 to Vr4. Similarly, when the selection signal SEL2 is enabled, the load driving apparatus 300_1 to 300_4 select the respectively corresponding output stages 314_1 to 314_4 to output the driving signal, so as to drive the gamma resistor string Res2 to generate the grayscale voltages according to the gamma voltages Vr1 to Vr4.

Generally speaking, in an application of a driving apparatus for a display, a gamma voltage usually needs to be precisely controlled to prevent a grayscale voltage generated by a gamma resistor string from being deviated from a preset voltage value. Therefore, by using the load driving apparatus disclosed in the exemplary embodiments of the disclosure, there is no need to configure any switch or any kind of selection unit between the output stage and load of the load driving apparatus. When the load driving apparatus is used in the grayscale voltage generating circuit, the problem that the grayscale voltage is deviated due to configuration of the switch or selection unit may be avoided.

In view of the above, in the exemplary embodiments of the disclosure, the load driving apparatus has a plurality of output stage modules. When used with the output stage selection module, the load driving apparatus outputs the driving signal to the corresponding load according to the selection signal and drives the corresponding load. When used in the grayscale voltage generating circuit, the problem that the grayscale voltage is deviated due to the additional configuration of a switch or selection unit is avoided.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claim is:
1. A grayscale voltage generating circuit, comprising:
  a plurality of gamma resistor strings, generating a plurality of grayscale voltages according to a plurality of driving signals; and
  a plurality of the load driving apparatus, configured to receive different gamma voltages, and generate the plurality of driving signals according to the different gamma voltages,
  wherein the plurality of load driving apparatus output the plurality of driving signals to one of the gamma resistor strings according to a selection signal, such that the one of the gamma resistor strings generates the grayscale voltages,
  wherein the plurality of load driving apparatus respectively comprising:
    an output stage module, comprising a plurality of output stages, and each of the output stages comprises a plurality of transistors, wherein each of the output stages is coupled to a corresponding one of the loads through the plurality of transistors;
    a load driving module, configured to provide the plurality of driving signals; and
    an output stage selection module, coupled between gates of the transistors of the output stage module and the load driving module, wherein the load driving module outputs the plurality driving signals to the output stage selection module, and the output stage selection module selects one of the output stages according to the selection signal, such that the load driving module drives the load coupled to the selected output stage through the selected output stage, wherein the output stage selection module respectively bypasses the plurality of driving signals to the gates of the transistors of the selected output stage, and does not bypass any of driving signals to the un-selected output stages.

2. The grayscale voltage generating circuit as claimed in claim 1, wherein for each of the load driving apparatus, the output stage selection module comprises:

a plurality of selection units, coupled between a corresponding one of the output stages and the load driving module, wherein each of the selection units is conducted according to the selection signal, such that the load driving module drives the load coupled to the output stage through the conducted selection unit and the output stage coupled to the selection unit.

3. The grayscale voltage generating circuit as claimed in claim 2, wherein for each of the load driving apparatus, when one of the selection units is conducted, rest of the selection units are not conducted.

4. The grayscale voltage generating circuit as claimed in claim 1, wherein for each of the load driving apparatus, the load driving module comprises:

an input stage, configured to receive an input signal and generate an internal signal based on the input signal; and a gain stage, coupled to the input stage, configured to receive the internal signal, and generate the driving signals to the output stage module based on the internal signal.

5. The grayscale voltage generating circuit as claimed in claim 1, wherein for each of the load driving apparatus, the output stages are output stages in a push-pull configuration, a common source configuration, or a common drain configuration.

6. The grayscale voltage generating circuit as claimed in claim 1, wherein each of the load driving apparatus is an operational amplifier having double output stages.

* * * * *